United States Patent [19]

Patenaude et al.

[11] Patent Number: 4,867,050

[45] Date of Patent: Sep. 19, 1989

[54] BARBECUE DEVICE

[76] Inventors: Jean-Pierre Patenaude, 69 Trillium, Dollard des Ormeaux, Quebec, Canada; Gilles-Joseph Patenaude, 13 Whitaker Rd., Fulton, N.Y. 13069

[21] Appl. No.: 116,201

[22] Filed: Nov. 3, 1987

[30] Foreign Application Priority Data

Aug. 4, 1987 [CA] Canada .................................. 543692

[51] Int. Cl.⁴ .......................... A47J 37/08; F24B 5/00
[52] U.S. Cl. ........................................ 99/400; 99/401;
99/444; 99/446; 99/447; 99/481; 126/15 A;
126/25 R
[58] Field of Search ................ 99/375, 401, 408, 425,
99/444, 446, 447, 448, 481, 482, 400; 126/15 A,
25 R, 15 R

[56] References Cited

U.S. PATENT DOCUMENTS

| | | | |
|---|---|---|---|
| 2,763,200 | 9/1956 | Kittler | 99/401 X |
| 2,894,448 | 7/1959 | Henderson et al. | 99/401 X |
| 2,940,381 | 6/1960 | Cottongim et al. | 99/401 X |
| 3,217,634 | 11/1965 | Fox | 99/447 X |
| 3,279,452 | 10/1966 | Hottenroth et al. | 99/447 X |
| 3,593,647 | 7/1971 | Copeland | 99/482 X |
| 4,319,556 | 3/1982 | Schwartz et al. | 126/15 A X |
| 4,335,702 | 6/1982 | Jarboe | 126/15 R |
| 4,454,805 | 6/1984 | Matthews | 99/401 X |
| 4,722,322 | 2/1988 | Varney et al. | 126/15 R X |

FOREIGN PATENT DOCUMENTS 1215282 12/1986 Canada .
850663 9/1952 Fed. Rep. of Germany ........ 99/447
3242264 12/1983 Fed. Rep. of Germany .

OTHER PUBLICATIONS

"The Most Significant Improvement to the BBQ Ever!", BO-OX Can-Am Project, Quebec, Canada, 1987, Patenaude.
Gebrauchsmuster, Roll No. 85 26 032.0; Sep. 12, 1985.

Primary Examiner—Harvey C. Hornsby
Assistant Examiner—Stephen F. Gerrity
Attorney, Agent, or Firm—Robic, Robic & Associates

[57] ABSTRACT

A barbecue cooking device includes a housing having a casing defining a combustion chamber supported centrally therein spaced from the walls of the housing. A heat shield surrounds the combustion casing and is spaced therefrom. A diffuser plate is mounted in the combustion chamber and includes openings in at least a portion thereof for the passage of air under pressure for creating a primary combustion zone. Air is forced against the bottom of the diffuser plate under pressure by an electrically driven fan. The combustion casing has a top open end spaced from the open top end of the housing where a cooking grill is supported. Air also is caused to flow between the combustion casing and the heat shield to supply air to the area at the top of the combustion casing for mixing with heated fuel gas from the primary combustion zone, whereby a secondary combustion zone is created above the combustion chamber and beneath the cooking grill.

10 Claims, 2 Drawing Sheets

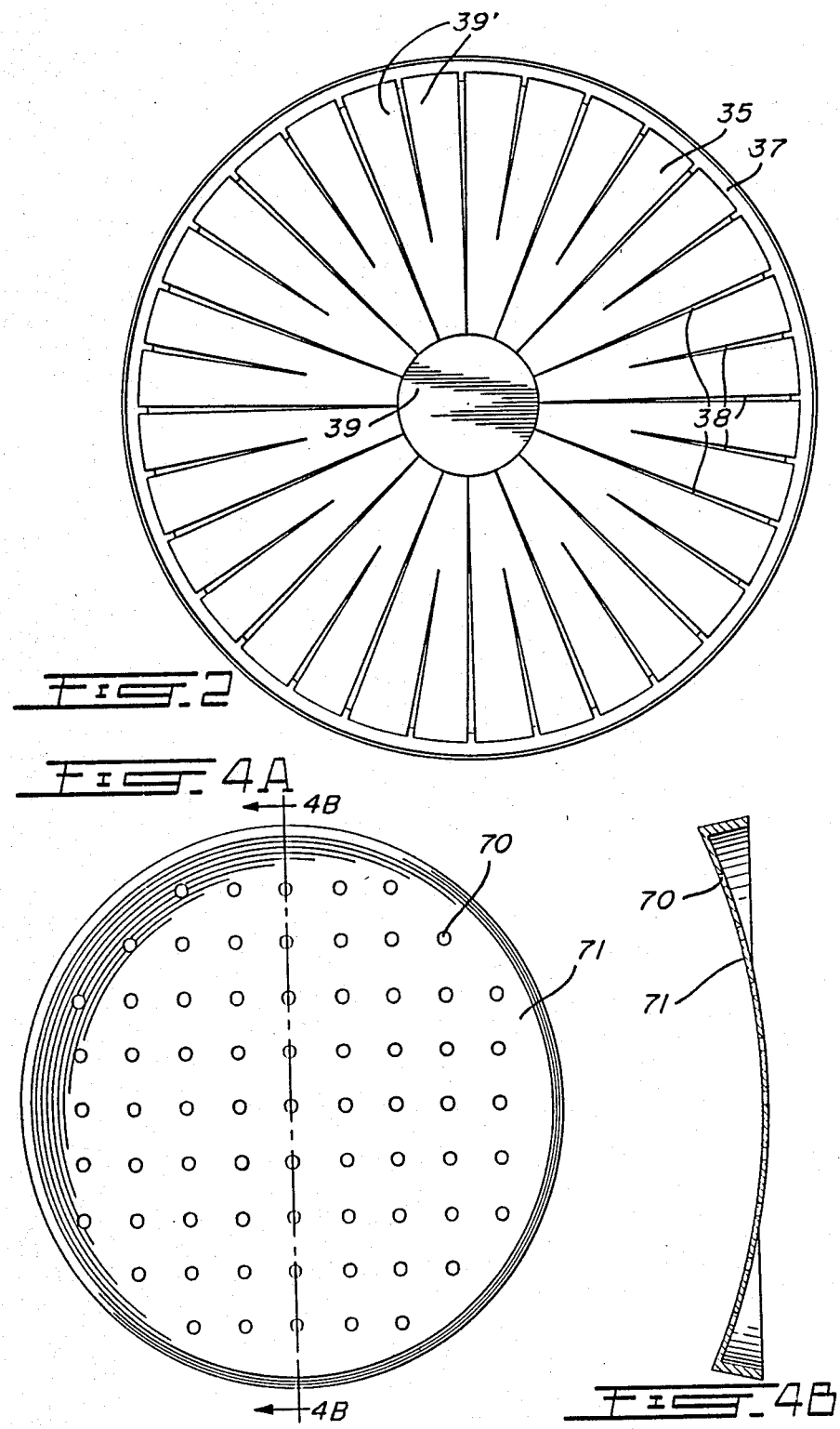

BARBECUE DEVICE

BACKGROUND OF THE INVENTION

1. Field of Invention

This invention relates to a barbecue cooking device, and, in particular to a portable barbecue cooking device.

My Canadian Pat. No. 1,215,282, issued on Dec. 16, 1986, describes a combustion system for burning solid fuel such as wood, and a few examples of applications of such a system. One application of the system is for a portable barbecue. The present invention is an improved version of the barbecue.

In most prior art barbecue devices, the combustion fuel is either charcoal or gas. In most barbecues utilizing charcoal, the intensity of the heat generated cannot be regulated. The major disadvantage of gas barbecues is that an adequate supply of gas must always be readily available. If there is no gas in the pressurized tank, the barbecue does not function. Gas is also an explosive substance, which is inherently dangerous. Moreover, with many existing barbecues a large quantity of heat is retained by the casing which makes the unit dangerous to carry immediately following operation.

SUMMARY OF INVENTION

An object of this invention is to provide a barbecue device which is light-weight and portable, which can be incorporated in many types of supports, which can be easily dismantled for cleaning, and which has two combustion zones.

Another object of this invention is to provide a portable barbecue device wherein the source of combustion may be a small quantity of wood, the combustion being controlled by air pressure provided by an electrical fan.

Yet another object of the invention is to provide a burning chamber for a cooking device which is small relative to the size of the cooking surface and which can ignite wood pieces almost instantaneously, and wherein the combustion rate may be controlled.

Accordingly, the present invention relates to a barbecue cooking device comprising housing means having an open top end for supporting a cooking grill; combustion casing means in said housing means, said casing means being spaced apart from said housing means; air metering plate means in said casing means dividing said casing means into an upper combustion chamber with an open top end and a lower air chamber; a plurality of openings in said air metering plate means for promoting combustion of a combustible material on said air metering plate means; duct means for introducing air under pressure into said air chamber; blower means for providing the air under pressure to said duct means; and heat diffuser means in said housing means between the open top ends of said housing means and said casing means for spreading the heat generated in said combustion chamber substantially uniformly over the area of said open top end of the housing means.

BRIEF DESCRIPTION OF DRAWINGS

A preferred embodiment of the invention will now be described with reference to the accompanying drawings, wherein:

FIG. 2 is a plan view of a diffuser plate used in the device of FIG. 1;

FIG. 4A is a plan view of an air metering plate used in the device of FIG. 1; and FIG. 4B is a cross section taken generally along line 4B—4B of FIG. 4A.

DESCRIPTION OF PREFERRED EMBODIMENTS

Figure 1:
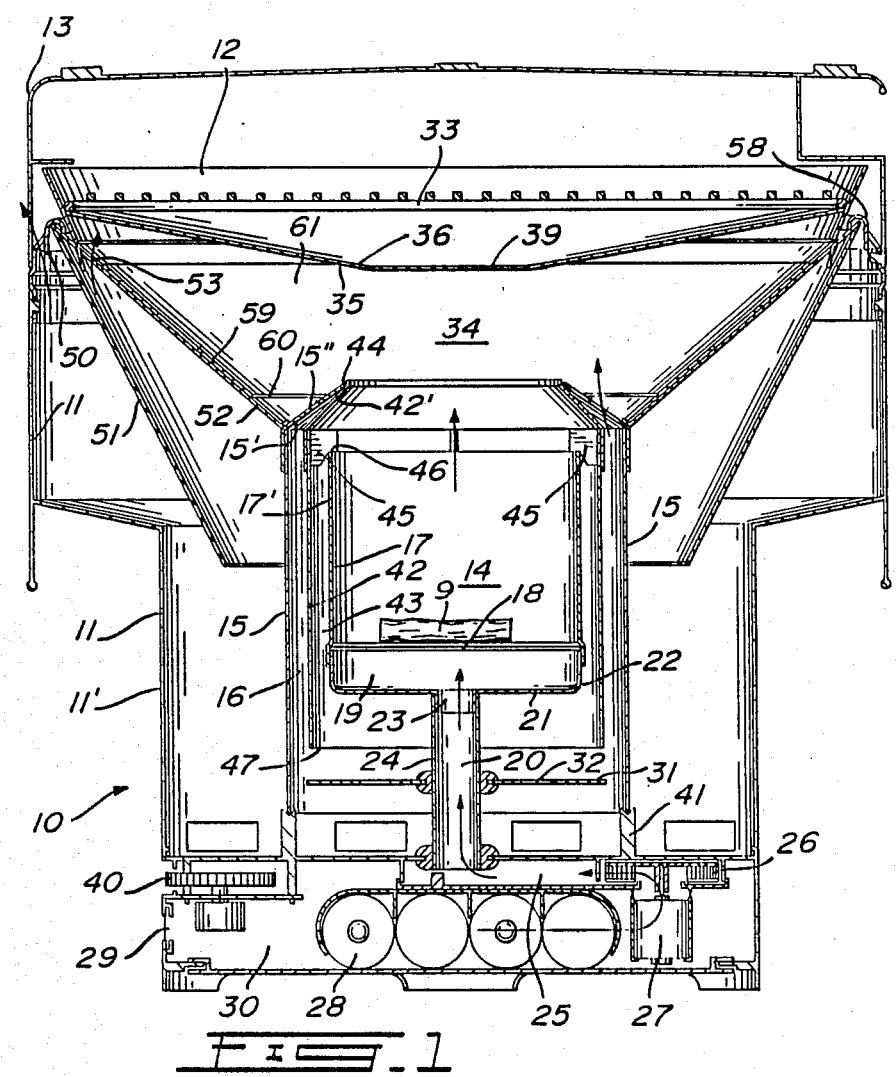
FIG. 1 is a longitudinal sectional view of a portable barbecue device in accordance with the present invention.

Referring to FIG. 1, the portable barbecue cooking device of the present invention, which is generally indicated at 10 includes a cylindrical housing 11 formed of rolled aluminum or another suitable material. The housing 11 has an open top end 12 covered by a cover 13. A combustion chamber 14 defined by a casing 17 is provided in the centre of the housing 11 spaced from the side wall 11' thereof. A heat shield 15 surrounds the casing 17 and is spaced therefrom. A draft passage 16 is defined by the outer wall 17' of the casing 17 and the heat shield 15.

The combustion chamber 14 also includes an air metering plate 18 at its bottom end supported on a cup-shaped base 22 defining an air chamber 19. The base 22 includes a circular bottom wall 21. The air metering plate 18 is supported by the base 22 in spaced apart relationship to the bottom wall 21. A central inlet duct 23 in the bottom wall 21 is connected to a vertical tube 24 defining a passage 20 in the chamber 19. The bottom end of the tube 24 is connected to a cage 25 in substantially airtight relationship. An impeller wheel 26 is mounted in the cage 25, and is driven by an electric motor 27. A power supply (in this case DC dry cells or batteries 28) provides power for the electric motor 27. An opening 29 in the housing 11 permits the connecting of the motor 27 to an AC/DC adapter cord (not shown). Outside air is sucked into the housing 11 through the opening 29 by the impeller wheel 26 to pressurize the air chamber 19, whereby air under pressure is forced through the perforated air metering plate 18 to promote combustion. A negative pressure in relation to atmospheric pressure is created above the plate 18 which promotes substantially instant and complete combustion.

A heat baffle disc 31 is mounted on the tube 24. The outer edge of the disc 31 is spaced from the heat shield 15. A plurality of openings 32 are provided in the disc 31, so that air can flow around the periphery of the disc and through the openings 32 to supply air to the draft passages surrounding the combustion chamber.

A disc-shaped tray 35 is provided at the top end 12 of the housing 11. The tray 35 carries a grill 33 intended to support food to be cooked by the heat generated in the combustion chamber 14. The combustion chamber 14 constitutes a primary combustion zone, in which combustion is achieved by placing small pieces of wood 9 on the plate 18 and igniting the wood with a starter material such as crushed paper, leaves, or the like. The heat in the combustion chamber 14 will rise entraining fuel gases and creating an updraft in the passages 43 and 16 between the heat shields 15 and 42, and between the heat shield 42 and the combustion chamber wall 17, whereby gases and heated air will meet and mix to create a secondary combustion zone in the area designated by reference numeral 34 above the combustion chamber 14 and beneath the grill 33 where heat is required.

As shown in FIG. 2, a heat diffusing shield defined by the tray 35 supports the cooking grill 33. The tray 35 has a concave bottom wall 36 (FIG. 1) secured at its circumference to a support ring 37. A plurality of radially extending and equidistantly spaced slots 38 are provided in the bottom wall 36 and extend from the support ring 37 to a solid central portion 39. The slots 38 are provided in the bottom wall 36 and extend from the support ring 37 to a solid central portion 39. The slots 38 taper inwardly towards the central portion 39 to define elongated narrow triangular openings through which heat will pass. The central portion 39 and solid radially extending bottom wall portions 39' collect most of the drippings from food placed on the cooking grill 33, and protect the plate 18 from clogging by such drippings or other foreign substance which may be released from the food. The tray 35 is designed to disperse the flames and heat, i.e. to provide substantially uniform heat distribution for the food being cooked. The purpose of the tray 35 is to convert a concentrated flame into a lower and a more uniform heat pattern. It will be appreciated that the tray 35 can be used with gas burners.

In order to control the intensity of the heat generated by the fire on the plate 18, heat control means in the form of a potentiometer device 40 is provided in the bottom end 30 of the housing 11. The device 40 varies the voltage fed to the fan motor 27. Accordingly, by turning a wheel on the device 40, the speed of the motor is controlled, and consequently the air flow to the combustion material, the rate of combustion and the intensity of heat are also controlled. As previously described, the power supply is DC batteries. However, the unit is adapted for operation by a 12 volt car battery or the normal 115 volt, 60 cycle household power supply through an AC/DC adaptor.

As illustrated in FIG. 1, there are two heat shields surrounding the wall 17' of the combustion chamber 14. The outer shield 15 is a cylindrical metal tube which is removably mounted on a support ring 41, and is uniformly spaced from the wall 17' of the combustion chamber 14. The inner heat shield 42 is also a tube removably mounted between the wall 17' and the outer shield 15 to create two separate air draft passages 16 and 43. Frusto-conical covers 15' and 42' are provided on the shields 15 and 42, such covers converging to meet at a common point 44. Spaced apart connectors 45 are provided on the shield 42. The connectors 45 extend inwardly to abut the open top end 46 of the casing 17. The bottom edge 47 of the shield 42 is spaced from the support ring 41 for the outer shield 15. A plurality of openings 15" are provided in the cover 15' for discharging the air from the passage 16. The passage 16 acts as a buffer to cool the outer heat shield 15 and to direct the heat to where it is needed. The inner passage 43 provides hot air to the secondary combustion zone 34, and acts as a buffer by diminishing the heat intensity on the inner heat shield 42.

Figure 3:
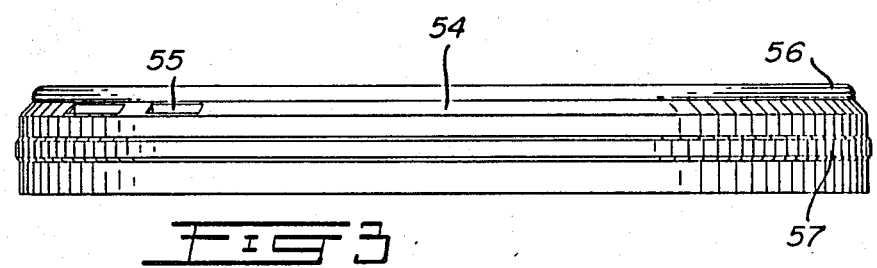
FIG. 3 is a side view of a support ring used in the device of FIG. 1.

Referring again to FIG. 1, inverted frusto-conical upper heat shields 51 and 52 are provided in the upper portion of the housing 11 in the area surrounding the secondary combustion zone 34. The shields 51 and 52 are detachably connected to the housing 11 by a plurality of connectors 50. The narrow bottom end of the inner shield 52 abuts the top edge of the shield 15 and includes air passages 53 adjacent the outer circumferential edge thereof for cooling the circumferential area of the housing 11. The outer shield 51 is intermediate the inner shield 52 and the housing side wall 11'. The shield 51 is steeper than the shield 52 for providing additional heat shielding for the housing 11. The top edges of the shields 51 and 52 are interconnected by a connecting ring 54. (FIG. 3).

Attachment holes 55, a lock bead 56 and a stopper bead 57 are provided on the ring 54. The lock bead 56 is received by the loops 58 of the connectors 50, and the bead 57 limits movement of the ring 54 into the casing 11.

A frusto-conical pan support plate 59 is provided on the upper surface of the inner shield 52. The plate 59 is supported on the inner shield 52. When the cooking grill 33 and tray 35 are removed, the plate 59 can be used to support a cooking pan (not shown) over a central opening 60 therein, so that downwardly tapering side wall 61 thereof concentrates heat from the primary and secondary combustion zones to the central opening 60. Thus, intense heat would be provided on the bottom surface of the cooking pan.

Referring to FIGS. 4A and 4B, a modified version of the air metering plate 18 of FIG. 1 includes perforations 70 arranged in a specific pattern. As in the plate 18 of FIG. 1, the holes meet the following requirements:
hole diameter 0.038"
spacing 0.433" (in a square distribution pattern).
The percentage of opening area is calculated by the formula:

$D^2/C^2 \times 78.54$ (constant) for a square distribution pattern $D^2/C^2 \times 90.5$ for a 60° quincuncial distribution pattern $D^2/C^2 \times 157.08$ for a 45° quincuncial distribution pattern and wherein D is the diameter C is the centre-to-centre distance between adjacent holes For the combustion of wood, a percentage of opening area below 0.55 is believed to supply insufficient air for achieving adequate combustion. A percentage above 0.7 is believed to supply a quantity of air in excess of that required to achieve adequate combustion. Air metering permits the selection of the desired quantity of air near the top surface of the air metering plate 18. By making it possible to provide a substantially precise quantity of air in either a closed chamber or in open air applications, this technique may be applied to many uses which require specific air dosage.

For a hole diameter of 0.038" in a square distribution pattern, the opening area percentage should be 0.60 and the spacing between holes 11 mm.

For a hole diameter of 0.038" in a square distribution pattern, the opening area percentage should be 0.66, and the spacing between holes 10.5 mm.

For a hole diameter of 0.038" in a square distribution pattern, the opening area percentage should be 0.73, and the spacing between holes 10 mm.

For a hole diameter of 0.036, in a square distribution pattern the opening area percentage should be 0.65, and the spacing between holes 10 mm.

The top surface 71 of the air metering plate 18 may be flat or concave (FIG. 4B), with or without projections. A concave plate ensures that solid fuel does not obstruct the openings 70. It is worth mentioning that, with the structure of the present invention, there is substantially complete combustion of the wood or other material and very little ash is accumulated, particularly because air under pressure is ejected through the openings 70. Ash would have a tendency of collecting in the upper area of the barbecue between the inner shield 52 and the tray 35 under the cooking grill 33 and in the circumferential cavity between the shield 52 and the cover 15'. All of the elements in the housing 11 and above the bottom end portion 30 are removably interconnected for easy cleaning. Moreover, the barbecue is compact, lightweight, versatile and does not require gas or any AC supply, but can operate independently. Although the impeller wheel 26 is driven by a motor 27, it is also possible to provide a manually actuated crank for initiating combustion by generating the required air flow. The result would be a barbecue which does not rely on any electrical power source or artificial combustible material.

The barbecue can be used to cook over charcoal briquets which are placed in the tray 35, wood being used in the combustion chamber 14 to ignite the briquets quickly and easily, e.g. in two to three minutes. Once the briquets are ignited, the control is turned off and food is cooked on the cooking grill 33 which is raised or lowered by elevating means inserted on the tray 35 in a conventional manner. Thus, combustion is only required to ignite the charcoal briquets. However, the wood burning primary use is the most desirable and healthy manner of cooking food on a grill, because the food is exposed to very small quantities of potentially harmful gases.

The embodiments of the invention in which an exclusive property or privilege is claimed are defined as follows:

1. A barbecue cooking device comprising:
   housing means having an open top end for supporting a cooking grill and an air-opened bottom end;
   combustion casing means centrally mounted in said housing means, said casing means being spaced apart from said housing means and having an open top end and a closed bottom end;
   air metering plate means in said casing means dividing said casing means into an upper, principal combustion chamber with an open top end and a lower, closed pressure chamber;
   a plurality of openings through said air metering plate means for promoting controlled combustion of a solid combustible material placed on top of said air metering plate means and thus generating a substantial amount of heat in said principal combustion chamber;
   airtight duct means for introducing air under pressure into said pressure chamber through the bottom end of said casing means;
   blower means for providing said air under pressure to said duct means, whereby relatively high velocity air is introduced into said combustion chamber through said air metering plate means to provide said controlled combustion;
   heat diffuser means in said housing means between the open top ends of said housing means and said casing means for spreading the heat generated in said principal combustion chamber substantially uniformly all over said open top end of the housing means;
   first tubular heat shield means with open top and bottom ends extending around said combustion casing means inside said housing means, said first heat shield means defining with said casing a first annular air draft passage for supplying fresh air in a preheated form to the top end of said principal combustion chamber;
   first frusto-conical cover means close to said top end of said principal combustion chamber to force said fresh air supplied through said first air draft passage to mix with fuel gases entrained from said principal combustion chamber to form a secondary combustion chamber between said principal combustion chamber and said heat diffuser means; and
   second heat shield means extending across said housing means all around said casing means and first heat shield means to provide a bottom to said secondary combustion chamber.

2. A barbecue device according to claim 1, wherein said heat diffuser means includes a central disc means for preventing drippings from food reaching the air metering plate means; and slotted skirt means extending radially outwardly from said disc means for retaining heat, passing products of combustion through the heat diffuser plate means, while restricting the exhaust of the products of combustion to uniformly distribute heat in said secondary combustion chamber.

3. A barbecue device according to claim 1 including control means for controlling the power supplied to said blower means, whereby the velocity of air to said principal combustion zone and consequently the heat generated by the device are controlled.

4. A barbecue device according to claim 3 wherein said control device includes a potentiometer for controlling the voltage to said blower means.

5. A barbecue device according to claim 1, including third heat shield means with open top and bottom ends in said housing means, said third heat shield means surrounding said first heat shield means and defining therewith a second air draft passage ensuring that heat is retained in said principal combustion chamber and that said housing means remains relatively cool.

6. A barbecue device according to claim 5, wherein said casing means and first and third heat shield means are cylindrical, the device including second frusto-conical cover means converging to meet the first cover means above the casing means for concentrating heat into a cooking area.

7. A barbecue device according to claim 5, wherein said second heat shield means has an inverted frusto-conical shape and has a bottom end abutting a top edge of said first and third heat shield means.

8. A barbecue device according to claim 7, including fourth, inverted frusto-conical heat shield means surrounding said second heat shield means, said second and fourth heat shield means having butting top ends, said fourth heat shield means having a bottom end spaced apart from and extending downwardly beyond the top edge of said first and third heat shield means.

9. A barbecue device according to claim 1, wherein said air metering plate means includes a concave top surface, whereby air from said pressure chamber is directed inwardly towards combustible material in said principal combustion chamber.

10. A barbecue device according to claim 1, including heat baffle disc means in the housing under said casing means and said first heat shield means and wherein said blower means is located in said housing means under said heat baffle disc means.

* * * * *